(12) United States Patent
Adkins et al.

(10) Patent No.: US 8,099,791 B1
(45) Date of Patent: *Jan. 17, 2012

(54) METHOD OF AUTHENTICATING A CONSUMABLE IN AN IMAGING DEVICE

(75) Inventors: Christopher Alan Adkins, Lexington, KY (US); Douglas Keith Peterson, Jr., Irvine, KY (US)

(73) Assignee: Lexmark International, Inc., Lexington, KY (US)

( * ) Notice: Subject to any disclaimer, the term of this patent is extended or adjusted under 35 U.S.C. 154(b) by 1256 days.

This patent is subject to a terminal disclaimer.

(21) Appl. No.: 10/877,672

(22) Filed: Jun. 25, 2004

(51) Int. Cl.
*G06F 1/26* (2006.01)
*G06F 11/00* (2006.01)
*G08B 13/00* (2006.01)
*G08B 21/00* (2006.01)
*G08B 29/00* (2006.01)
*G06F 1/00* (2006.01)
*G06F 13/00* (2006.01)

(52) U.S. Cl. ............ 726/34; 726/9; 726/20; 713/167; 713/169; 713/175; 713/184; 380/271; 347/7; 347/19

(58) Field of Classification Search ............ 347/19, 347/7; 713/167, 169, 175, 184; 380/271; 726/9, 20, 34

See application file for complete search history.

(56) References Cited

U.S. PATENT DOCUMENTS

| 4,799,061 | A |   | 1/1989  | Abraham et al. |         |
|-----------|---|---|---------|----------------|---------|
| 4,872,027 | A |   | 10/1989 | Buskirk et al. |         |
| 5,148,534 | A |   | 9/1992  | Comerford      |         |
| 5,343,529 | A | * | 8/1994  | Goldfine et al. | 705/75 |
| 5,379,240 | A | * | 1/1995  | Byrne          | 708/209 |
| 5,506,905 | A |   | 4/1996  | Markowski et al. |       |
| 5,530,753 | A |   | 6/1996  | Easter et al.  |         |
| 5,761,566 | A |   | 6/1998  | Suzuki et al.  |         |
| 5,831,649 | A |   | 11/1998 | Watrobski et al. |       |
| 5,841,872 | A | * | 11/1998 | Colvin, Sr.    | 380/28  |
| 5,949,467 | A |   | 9/1999  | Gunther et al. |         |
| 5,949,879 | A |   | 9/1999  | Berson et al.  |         |
| 5,978,475 | A |   | 11/1999 | Schneier et al. |        |
| 6,019,461 | A | * | 2/2000  | Yoshimura et al. | 347/86 |
| 6,028,937 | A |   | 2/2000  | Tatebayashi et al. |     |
| 6,084,969 | A | * | 7/2000  | Wright et al.  | 380/271 |
| 6,192,473 | B1 |  | 2/2001  | Ryan, Jr. et al. |       |
| 6,212,505 | B1 |  | 4/2001  | Herbert        |         |
| 6,263,170 | B1 |  | 7/2001  | Bortnem        |         |
| 6,299,274 | B1 |  | 10/2001 | Bolash et al.  |         |

(Continued)

FOREIGN PATENT DOCUMENTS

JP 04-150428 A 5/1992

OTHER PUBLICATIONS

Menezes et al. "Handbook of Applied Cryptography": Chapter 9. (1996). http://www.cacr.math.uwaterloo.ca/hac/about/chap9.pdf.*

(Continued)

*Primary Examiner* — Christian LaForgia
*Assistant Examiner* — Kari Schmidt

(57) ABSTRACT

A method of generating an authentication code for a consumable in an imaging device, includes the steps of: an identification number assigned to the consumable; processing an indemnification number assigned to the consumable using a first algorithm to generate a preliminary number different from the identification number; and compressing the preliminary number using a compression algorithm that utilizes the identification number to generate the authentication code.

17 Claims, 8 Drawing Sheets

U.S. PATENT DOCUMENTS

| | | |
|---|---|---|
| 6,325,495 B1 | 12/2001 | Foth |
| 6,362,869 B1 | 3/2002 | Silverbrook |
| 6,366,742 B1 | 4/2002 | Reihl et al. |
| 6,374,354 B1 * | 4/2002 | Walmsley et al. ............ 713/167 |
| 6,406,120 B2 | 6/2002 | Pauschinger |
| 6,416,154 B1 | 7/2002 | Silverbrook |
| 6,442,525 B1 * | 8/2002 | Silverbrook et al. ............ 705/1 |
| 6,499,104 B1 | 12/2002 | Joux |
| 6,547,364 B2 | 4/2003 | Silverbrook |
| 6,622,247 B1 | 9/2003 | Isaak |
| 6,738,903 B1 | 5/2004 | Haines |
| 6,969,136 B1 | 11/2005 | Matsumoto et al. |
| 7,203,841 B2 | 4/2007 | Jackson et al. |
| 7,240,995 B2 | 7/2007 | Adkins et al. |
| 7,415,615 B2 * | 8/2008 | Skygebjer .................... 713/184 |
| 7,585,043 B2 | 9/2009 | Adkins et al. |
| 2001/0020961 A1 | 9/2001 | Pauschinger |
| 2002/0030713 A1 | 3/2002 | Silverbrook |
| 2002/0036668 A1 * | 3/2002 | Matsumoto et al. ............ 347/19 |
| 2002/1003071 | 3/2002 | Silverbrook |
| 2002/0078062 A1 * | 6/2002 | Kataoka et al. ............... 707/101 |
| 2002/0188860 A1 | 12/2002 | Parry et al. |
| 2002/0194476 A1 * | 12/2002 | Lewis et al. ................... 713/169 |
| 2003/0159036 A1 | 8/2003 | Walmsley et al. |
| 2003/0172268 A1 | 9/2003 | Walmsley et al. |
| 2005/0198474 A1 * | 9/2005 | Nancekievill et al. ........ 712/223 |

OTHER PUBLICATIONS

RSA Laboratories, 2.1.6, "What is a Hash Function?" p. 2, Fig. 2.7, http://www.rsasecurity.com/rsalabs/node.asp?id=2176.

RSAES-OAEP Encryption Scheme Algorithm specification and supportin gdocumentation, RSA Laboratories, RSA Security Inc., pp. 9-11, 20.

* cited by examiner

METHOD OF AUTHENTICATING A CONSUMABLE IN AN IMAGING DEVICE

CROSS REFERENCE TO RELATED APPLICATIONS

This application is related to U.S. patent application Ser. No. 10/431,485, entitled "METHOD OF AUTHENTICATING A CONSUMABLE", filed May 6, 2003.

BACKGROUND OF THE INVENTION

1. Field of the Invention

The present invention relates to an imaging device, and, more particularly, to a method of authenticating a consumable used in an imaging device.

2. Description of the Related Art

In the imaging arts, a consumable is an item that is used by the imaging device during imaging. One example of a consumable is a supply item, such as for example, an ink supply tank, an ink jet printhead cartridge, a toner tank, or electrophotographic process (EP) cartridge, that contains a supply of an imaging substance, such as for example ink or toner, that is consumed during an imaging process. Examples of such an imaging device include an ink jet printer and/or copier, or an electrophotographic printer and/or copier. During imaging with the imaging device, the amount of the imaging substance is depleted. Thus, eventually, once the imaging substance supply of the supply item is exhausted, the supply item either may be discarded or may be replenished with imaging substance. In either event, the consumer must provide a new supply of imaging substance in order to continue imaging.

What is needed in the art is a method of authenticating a consumable, such as a supply item, used in an imaging device.

SUMMARY OF THE INVENTION

The present invention provides a method of compressing an authentication code using an identification number unique to a consumable in an imaging device.

The invention, in one form thereof, relates to a method of generating an authentication code for a consumable, including the steps of: processing an identification number assigned to a consumable using a first algorithm to generate a preliminary number different from the identification number; and compressing the preliminary number using a compression algorithm that utilizes the identification number to generate the authentication code.

In another form thereof, the present invention relates to a method carried out in an imaging device for compressing a first binary number having a first number of bits to a second binary number having a second number of bits, the first number of bits being greater than the second number of bits, including the steps of: using a hashing algorithm with a plurality of inputs to generate an output corresponding to the first binary number; and compressing the first binary number using a selected one of the plurality of inputs.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
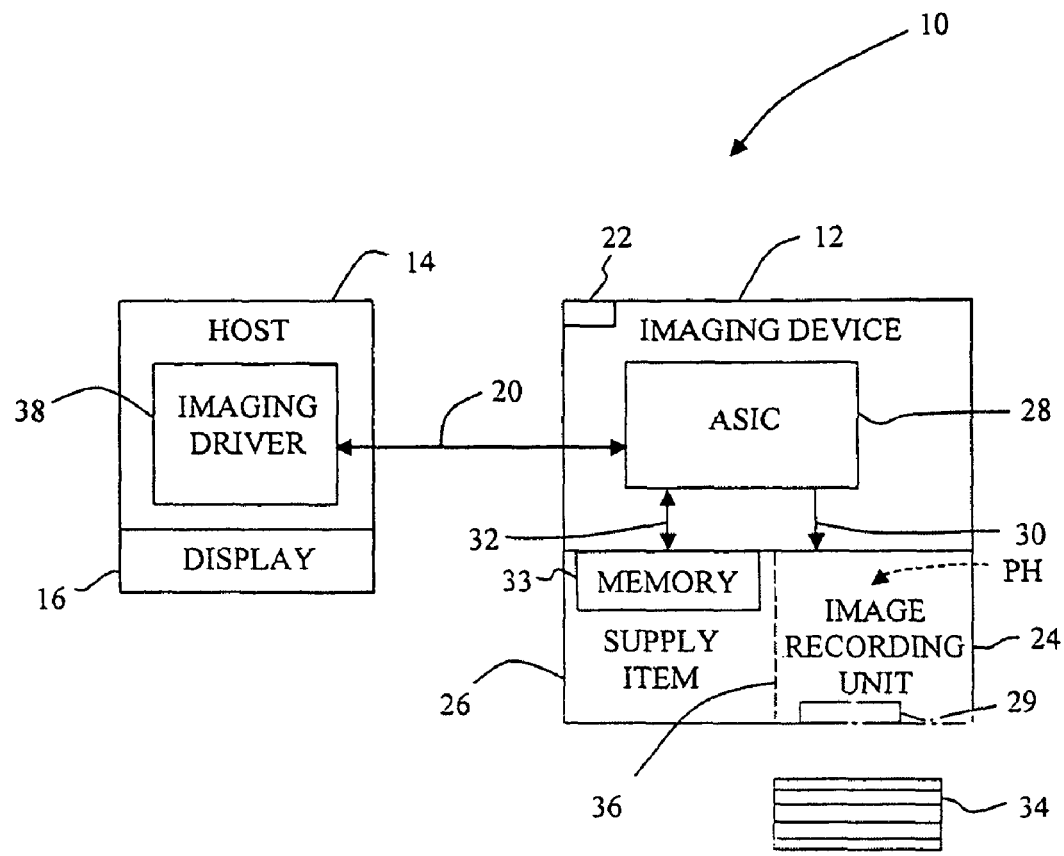
FIG. 1 is a diagrammatic depiction of a system used in association with the present invention.

Referring now to the drawings, and particularly to FIG. 1, there is shown a diagrammatic depiction of a system 10 used in association with the present invention. System 10 includes an imaging device 12 and a host 14. Imaging device 12 communicates with host 14 via a communications link 20.

Imaging device 12 includes a user interface 22, an image recording unit 24, a supply item 26 and an Application Specific Integrated Circuit (ASIC) 28. ASIC 28 communicates with image recording unit 24 via a communications link 30. ASIC 28 communicates with supply item 26 via a communications link 32. Imaging device 12 can be, for example, an ink jet printer and/or copier, or an electrophotographic printer and/or copier.

In the context of the examples for imaging device 12 given above, image recording unit 24 can be, for example, an ink jet printhead unit or an electrophotographic printing unit, and includes an imaging head 29 used for forming an image on a substrate 34, such as a sheet of print media or a photoconductive member. For convenience, each type of substrate 34 will be referred to by the element number 34, for example, print media 34. Supply item 26 can be, for example, an ink supply tank, an ink jet printhead cartridge (PH), a toner tank, or an electrophotographic process (EP) cartridge, each of which containing a supply of an imaging substance, such as for example ink or toner, that is consumed during an imaging process. Imaging device 12 uses the imaging substance contained in supply item 26 to form an image on print media 34. Print media 34 can be, for example, sheets of paper, fabric or transparencies.

Those skilled in the art will recognize that image recording unit 24 and supply item 26 may be formed as individual discrete units, or may be combined in an integral unit, these options being depicted by dashed line 36. For example, in ink jet technology, such an integral unit may be an ink jet printhead cartridge PH including an ink reservoir and an ink jet printhead formed as a unitary consumable. Thus, for convenience, the term "supply item" is used to encompass either the discrete configuration or the integral configuration described above, and is an example of a consumable. Preferably, supply item 26 has mounted thereto a memory 33 for storing information relating to supply item 26, more fully described below with respect to FIG. 2. In the case of ink jet printhead cartridge PH, memory 33 may be formed on a part of the printhead silicon.

Host 14 may be, for example, a personal computer including a display device 16, an input device (e.g., keyboard), a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 38 for imaging device 12. Imaging driver 38 is in communication with ASIC 28 of imaging device 12 via communications link 20. Imaging driver 38 facilitates communication between imaging device 12 and host 14, and provides formatted print data to imaging device 12.

Communications link 20 may be established by a direct cable or optical connection, or by a network connection such as for example an Ethernet local area network (LAN). Communications links 30 and 32 may be established, for example, by using standard electrical cabling or bus structures, or by wireless connection.

Figure 2:
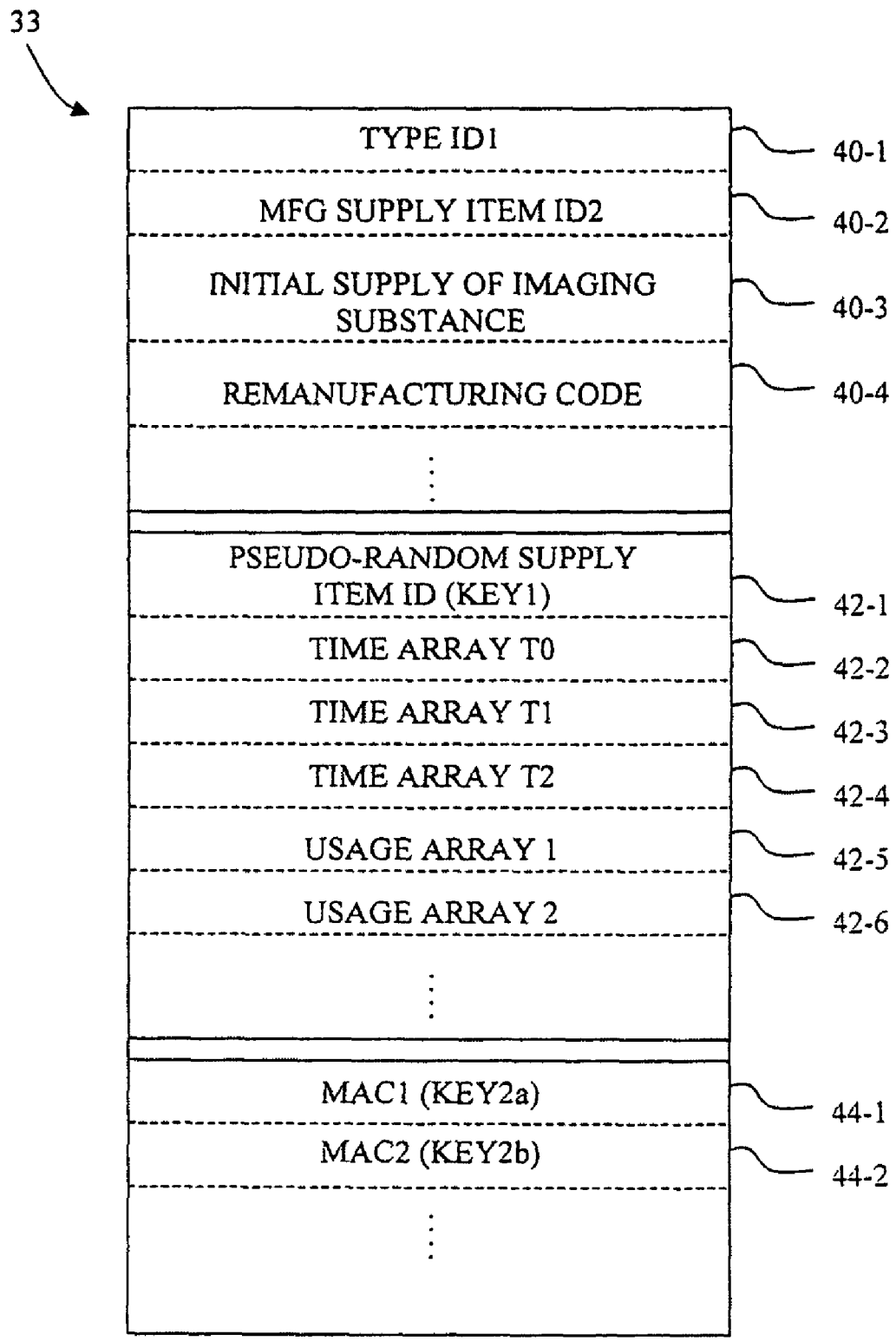
FIG. 2 is a graphical depiction of the memory of the consumable of FIG. 1.

FIG. 2 is a graphical depiction of memory 33 which for convenience is described as having a plurality of memory sections, namely, a memory section 40 that includes pre-programmed information generated during manufacturing, a memory section 42 that is programmed with information when supply item 26 is installed in imaging device 12 and during the use of imaging device 12, and a memory section 44 for storing information used for remanufacturing supply item 26. Actual memory locations within the above described memory sections need not be contiguous.

Memory section 40 includes a plurality of memory locations, including for example, memory locations 40-1, 40-2, 40-3 and 40-4. For example, in location 40-1 there can be stored an supply item type identification; in location 40-2 there can be stored an manufacturer's supply item identification, in location 40-3 there can be stored an initial amount of imaging substance; and, in location 40-4 there can be stored a remanufacturing code. The remanufacturing code may designate supply item 26 as either needing authentication after remanufacturing, or as not needing authentication after remanufacturing.

Memory section 42 includes a plurality of memory locations, including for example, memory locations 42-1, 42-2, 42-3, 42-4, 42-5, and 42-6. For example, in location 42-1 there can be stored a pseudo-random identification number (PID) for supply item 26; in location 42-2 there can be stored a time array T0 for storing a time of initial installation of supply item 26 in imaging device 12; in location 42-3 there can be stored a time array T1 for storing a time at which an imaging substance usage compensation algorithm is invoked; in location 42-4 there can be stored a time array T2 for storing a time at which it is predicted that, based on the imaging substance usage compensation algorithm, the available imaging substance supply will be depleted; in location 42-5 there is an array of usage bits that can be programmed to indicate the reaching of predetermined threshold levels of imaging substance consumption for supply item 26 as a new supply item; and in location 42-5 there is an array of usage bits that can be programmed to indicate the reaching of predetermined threshold levels of imaging substance consumption for supply item 26 as a renewed supply item.

The PID that is to be stored in location 42-1 can include a fixed portion and a randomly generated portion. The fixed portion can be provided by the manufacturer, such as for example, by using a portion, or all, of the manufacturer's supply item identification stored in location 40-2. The randomly generated portion may be generated by imaging device 12 using, for example, a re-circulating counter triggered by a free running clock. In one embodiment, the PID has a predetermined number of binary ones and zeros for any such PID generated.

In either of locations 42-5 or 42-6, each bit of the plurality of usage bits may represent a usage level corresponding to an amount of use of imaging substance from supply item 26. For example, each bit may represent a predefined amount of reduction in the quantity of imaging substance contained in supply item 26. As a more particular example, if location 42-5 has eight bits, each bit can represent approximately a 12.5 percent depletion of imaging substance from supply item 26. Each usage level bit may be programmed based on reaching an associated usage threshold which, for example, may be represented as an imaging substance dot count.

Memory section 44 includes a plurality of memory locations, including for example, memory locations 44-1 and 44-2. For example, in location 44-1 there can be stored a first message authentication code (MAC1), also sometimes referred to as KEY2$a$, and in location 44-2 there can be stored a second message authentication code (MAC2), also sometimes referred to as KEY2$b$. For example, MAC1 can be stored in memory location 44-1 to signify that the first renewal of supply item 26 was authorized, and MAC2 can be stored in memory location 44-2 to signify that the second renewal of supply item 26 was authorized. By attaching memory 33 to supply item 26, in essence, the stored information associated with supply item 26 can travel with supply item 26 from one imaging device to another.

Figure 3:
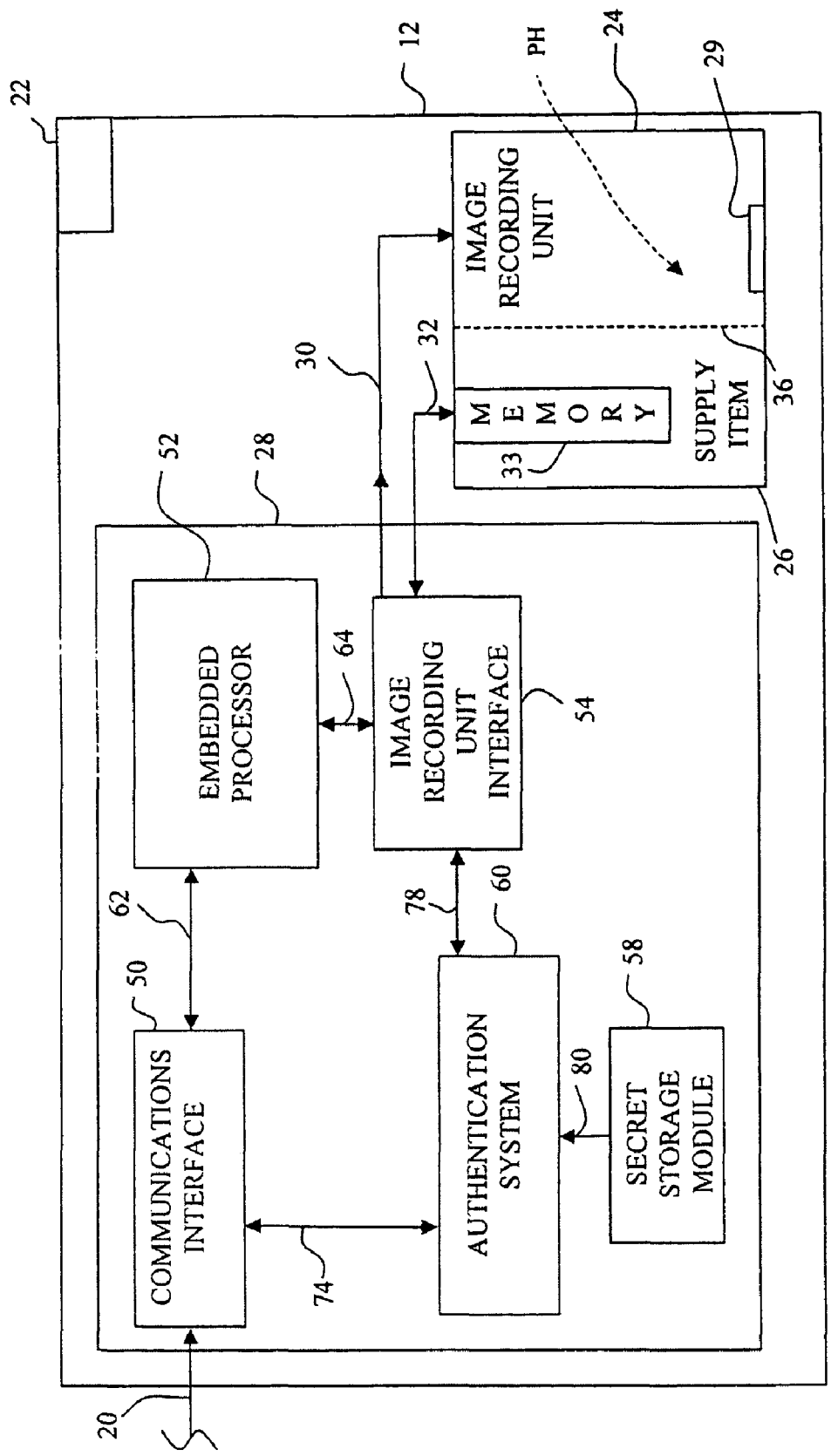
FIG. 3 is a block diagram showing functional blocks of the ASIC of FIG. 1.

FIG. 3 is a block diagram showing functional blocks of the ASIC 28 of FIG. 1. ASIC 28 includes a communications interface 50, an embedded processor 52, an imaging recording unit interface 54, a secret storage module 58 and an embedded authentication system (EAS) 60.

Alternatively, embedded authentication system (EAS) 60 may be located on supply item 26, such as for example, on the silicon containing memory 33, or located at some other location in imaging device 12, or located on host 14, for example in imaging driver 38. The decision where to locate embedded authentication system (EAS) 60 may be based on, for example, a desire to provide heightened security against physical tampering; and/or, a desire to provide heightened security against unauthorized programming access, such as by hackers.

Communications interface 50 facilitates communications with imaging driver 38 of host 14 via communications link 20 (see also FIG. 1). Embedded processor 52 is communicatively coupled to communications interface 50 via electrical path 62. Imaging recording unit interface 54 is communicatively coupled to embedded processor 52 via electrical path 64, is communicatively coupled to image recording unit 24 via communications link 30, and is communicatively coupled to memory 33 via communications link 32. Embedded authentication system (EAS) 60 is communicatively coupled to communications interface 50 via electrical path 74, is communicatively coupled to image recording unit interface 54 via electrical path 78, and is communicatively coupled to secret storage module 58 via electrical path 80.

Embedded processor 52 is used as a general controller for imaging device 12, and is used, for example, to control the feeding of print media 34 past printhead 29, and to control the operation of printhead 29, based on the formatted imaging data received from imaging driver 38.

EAS 60 is configured as firmware in ASIC 28, or alternatively is programmed into ASIC 28, to retrieve an authentication code, such as a message authentication code (MAC), if present, stored in memory 33 of supply item 26 and to execute a predefined authentication algorithm, such as a replication of the message authentication algorithm used for MAC generation, to generate a verifying code to verify that the renewal of supply item 26 was authorized. In other words, if the verifying code, e.g., MAC, generated by imaging device 12 is the same as the authentication code, e.g., MAC, that was stored in memory 33 during the renewal of supply item 26, then the renewal was authorized; otherwise, the renewal was not authorized. In order to verify each MAC as authentic, imaging device 12 will include in secret storage module 58 the secret used in generating the MAC. For example, if supply item 26 supports the storage of two MACs, MAC1 and MAC2, then imaging device 12 will contain in secret storage module 58 two separate 32-bit secrets (Sa and Sb) corresponding respectively to the MAC1 or MAC2 to be verified.

The type of renewal of supply item 26 will depend upon whether supply item 26 was subject to license. Types of renewals may include, for example, license renewal, imaging substance replenishing and supply item remanufacturing. For example, when the supply of available imaging substance is depleted, if supply item 26 is licensed and supply item 26 has a reserve amount of imaging substance to accommodate license renewals, the license can be renewed at which time a MAC will be supplied for storage in memory 33. If supply item 26 does not contain a reserve amount of imaging substance, supply item 26 can be refilled or remanufactured for continued use, such as for example, by replenishing the imaging substance supply of supply item 26, at which time a MAC will be stored in memory 33.

Figure 4A:
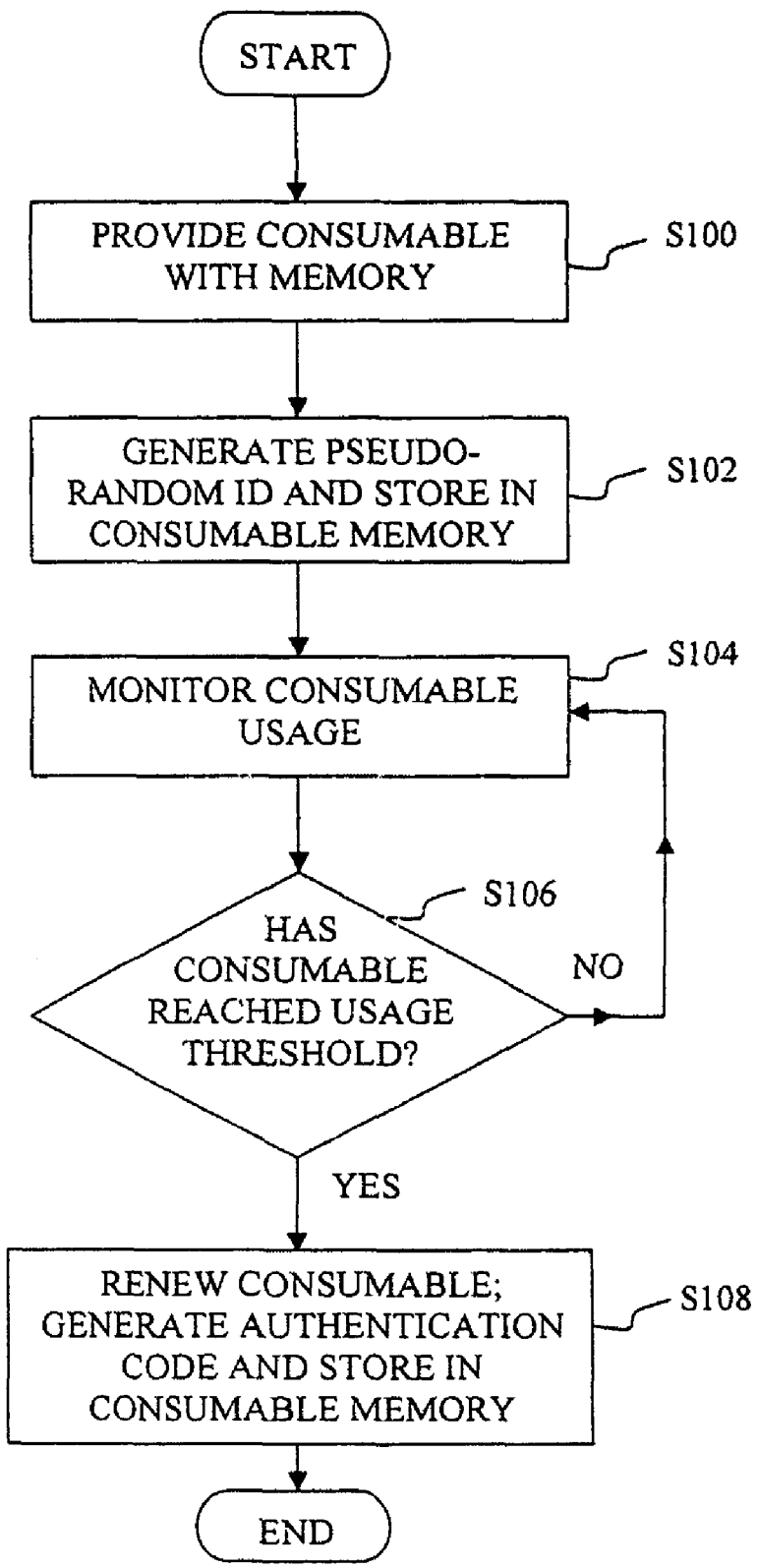
FIG. 4A is a flowchart of a general process of one aspect of a method of authenticating a consumable used in an imaging device, in accordance with the present invention.

FIG. 4A is a flowchart of a general process of one aspect of a method of authenticating a consumable used in an imaging device, in accordance with the present invention.

At step S100, a consumable, such as supply item 26, having memory 33 is provided for installation in imaging device 12.

At step S102, a pseudo-random supply item identification number is generated, for example, in ASIC 28 of imaging device 12, and is stored in location 42-1 of memory 33 of supply item 26. Also, other information, such as time information, e.g., T0, may be stored. It is to be noted, however, that the fixed portion of the pseudo-random supply item identified number is pre-stored during manufacturing, as well as some other preset values, such as for example, times T1 and T2.

At step S104, the usage of supply item 26 is monitored. For example, where supply item 26 is an ink jet printhead cartridge PH, usage of ink from the ink jet printhead cartridge PH can be monitored by counting the number of ink drops ejected from the printhead, which may for example occur by counting the number of actuations of ink expelling elements, or the number of drops commanded to be expelled by the imaging data. Such a drop count may be compensated to account for such factors as, for example, ink evaporation, temperature variations, humidity variations, etc.

At step S106, it is determined whether supply item 26 has been used to an extent to reach a predefined usage threshold. In practice, several usage thresholds may be defined, wherein upon reaching a subsequent threshold, another bit of usage array 1 or usage array 2, stored in locations 42-5 and 42-6 of memory 33, respectively, can be set to signify the attainment of next level of usage. An estimate as to the amount of remaining available imaging substance in supply item 26 may be made by simply subtracting the usage data from the initial supply amount stored in location 40-3 of memory 33 of supply item 26. One of the predefined thresholds, however, will be designated as the threshold at which the amount of remaining available imaging substance has been depleted. Prior to reaching this threshold, the process returns to step 104 to continuing monitoring usage of supply item 26. Upon reaching this threshold, the process proceeds to step S108.

At step S108, supply item 26 may be renewed. As stated above, the type of renewal of supply item 26 will depend upon whether supply item 26 was subject to license. For example, in view of the depleted supply of available imaging substance, if supply item 26 is licensed and supply item 26 has a reserve amount of imaging substance to accommodate license renewals, the license can be renewed at which time an authentication code, such as a message authentication code (MAC), will be supplied for storage in memory 33. If supply item 26 does not contain a reserve amount of imaging substance, supply item 26 can be renewed for continued use, such as for example, by replenishing the imaging substance supply of supply item 26. In either case, the presence of a valid authentication code will signify that the renewal of supply item 26 was authorized.

Figure 4B:
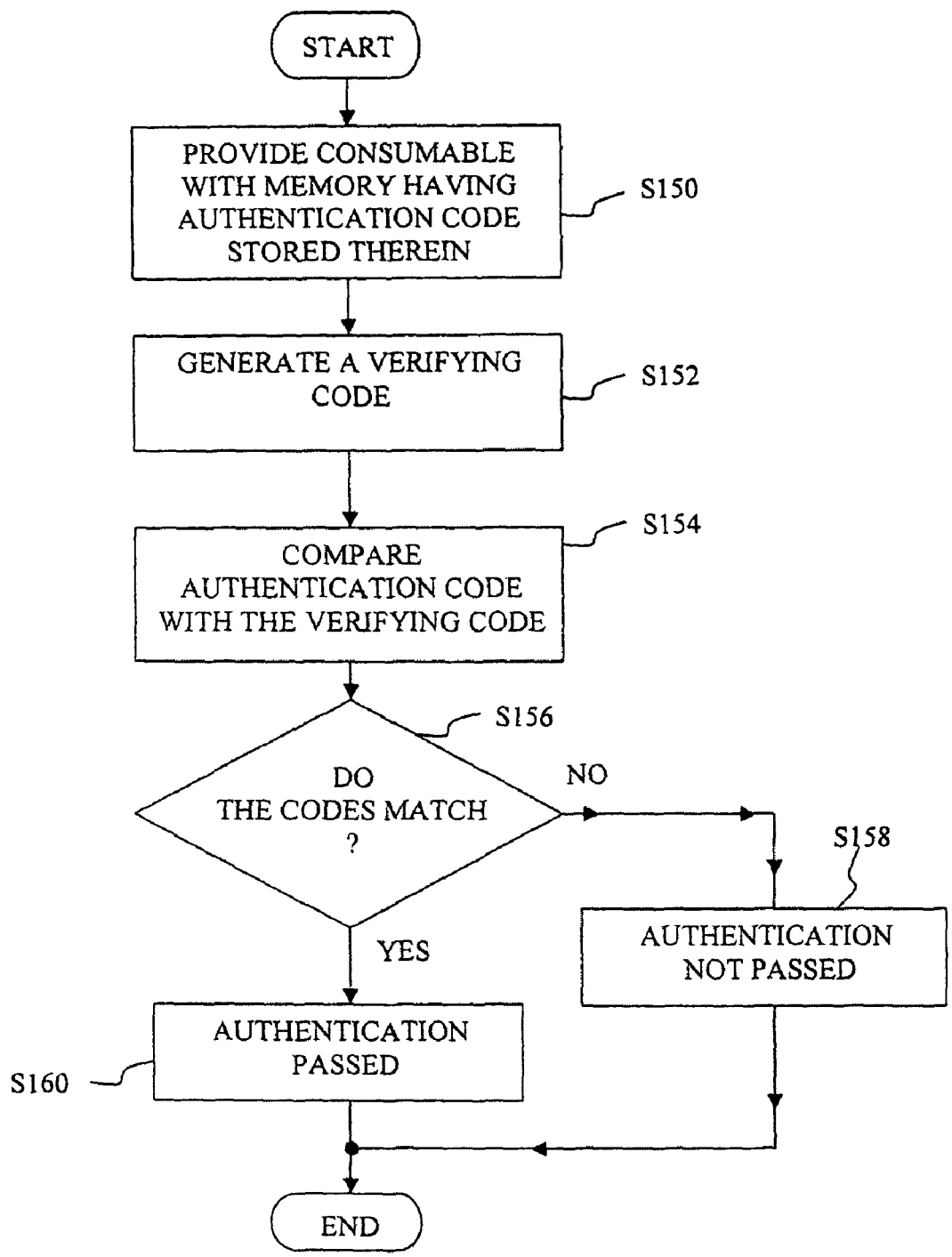
FIG. 4B is a flowchart of a general process of another aspect of a method of authenticating a consumable used in an imaging device, in accordance with the present invention.

FIG. 4B is a flowchart of a general process of another aspect of a method of authenticating a consumable used in an imaging device, in accordance with the present invention.

At step S150, there is provided a consumable, such as supply item 26, provided with memory 33 that has an authentication code, such as a MAC, stored therein. The authentication code signifies a renewal of the consumable, such as that described above with respect to FIG. 4A. Supply item 26 may be an ink jet printhead cartridge PH with memory 33 attached to ink jet printhead cartridge PH, e.g., wherein memory 33 is integral with printhead 29 of ink jet printhead cartridge PH.

At step S152, imaging device 12 generates a verifying code based on a secret located in the imaging device 12 and information stored in memory 33 of the consumable, e.g., supply item 26. In an exemplary implementation of the invention, the authentication code and the verifying code are generated independently using the same algorithm, such as a hashing algorithm. The information stored in memory 33 may include, for example, the pseudo-random identification number of supply item 26 and time parameters (e.g., T0, T1 and T2). The pseudo-random identification number may be generated by imaging device 12, such as through a random generation process, at a time of installation of supply item 26 in imaging device 12.

At step S154, imaging device 12 compares the authentication code stored in memory 33 with the verifying code generated at step S152 to determine whether the renewal was authorized.

At step S156, it is determined whether the authentication code matches the verification code.

If the result at step S156 is NO, the process proceeds to step S158 where it is indicated to the user that the authentication of the consumable, e.g., supply item 26, has not passed. In other words, if the renewal is not authorized, then appropriate action is taken, such as for example, by advising the user to acquire an authorized replacement for supply item 26 by posting a display at user interface 22 or at display 16 of host 14. As stated above, the renewal of the consumable may be, for example, a replenishing of an imaging substance supply in supply item 26 or a renewal of a license to use supply item 26.

If the result at step S156 is YES, the process proceeds to step S160 where it is indicated to the user that the authorization has passed. In other words, if the renewal was authorized, then normal printing may proceed.

Exemplary processes for generating a MAC suitable for use as the authentication code or verifying code are described below with respect to FIGS. 5 and 6. The MAC generation processes of FIGS. 5 and 6 utilize a keyed hashed message authentication coded (HMAC) protocol. A hash function is a one-way function such that it is computationally unfeasible to construct the input given a particular output. The output of the hash function may be pseudorandom such that if one bit of the input changes, there is a 50% probability that each bit of the output will change. One example of a hashing algorithm is commonly referred to as the Secure Hash Algorithm (SHA-1). This algorithm is specified by the Federal Information Standards Publication 180-1, which is incorporated herein by reference, and is available through the Internet at http://www.itl.nist.gov/fipspubs/fip180-1.htm, or http://csrc.nist.gov/publications/fips/fips180-2/fips180-2.pdf.

The generation of MAC1, also referred to herein as Key2$a$, to complete a first renewal of supply item 26 will now be described with respect to FIG. 5. While the example of FIG. 5 is described for convenience with supply item 26 being ink jet printhead cartridge PH, those skilled in the art will recognize that the process of FIG. 5 is adaptable to other types of supply items and/or consumables. Also, reference to specific numbers of bits used in association with particular variables is exemplary, and may be changed to accommodate the design constraints of a particular system. Also, it is to be understood that the same algorithm used to generate the MAC for renewal of the consumable, e.g., supply item 26, printhead cartridge PH, etc., can be used by imaging device 12 and/or host 14 in generating the verifying code MAC to be compared with the MAC stored in memory 33 to verify the authenticity of the renewed consumable.

At steps S200 and S202, it is determined whether the ink jet printhead cartridge PH is a monochrome cartridge, a color dye cartridge, or a color pigment cartridge. Of course, these steps can be easily expanded to cover other ink types.

Depending upon the ink type, e.g., mono, color dye or color pigment, at steps S204, S206 or S208 a specific 32 bit secret is selected, designated as SM for mono, SD for color dye, and SP for color pigment.

Also at step S210, a 32-bit secret (Sa) corresponding to MAC1 (Key2$a$) is selected.

At step S212, a 64 bit secret is created by concatenating secret Sa with one of secrets SM, SD or SP.

At steps S214, various parameters stored in memory 33 of ink jet printhead cartridge PH are retrieved. In this example, step S214-1 retrieves the 5-bit time parameter T0, step S214-2 retrieves the 3-bit time parameter T1, step S214-3 retrieves the 3-bit time parameter T2, step S214-4 retrieves the 4-bit ID1 from location 40-1, step S214-5 retrieves the 4-bit ID2 from location 40-2, and step S214-6 retrieves the 32-bit pseudo-random ID (Key1) from location 42-1.

At step S216, the 64-bit secret from step S212 is concatenated with the parameters retrieved in steps S214 from memory 33 of ink jet printhead cartridge PH to form a 115-bit output.

At step S218, the 115-bit output from step S216 will be processed using a SHA-1 algorithm to generate a 160-bit output digest.

At step S220, the 64-bit secret generated at step S212 is concatenated with the 160-bit output digest of step S218 to form a 224-bit input to step S220, which in turn is processed using a SHA-1 algorithm to generate a second 160-bit output digest.

Figure 5:
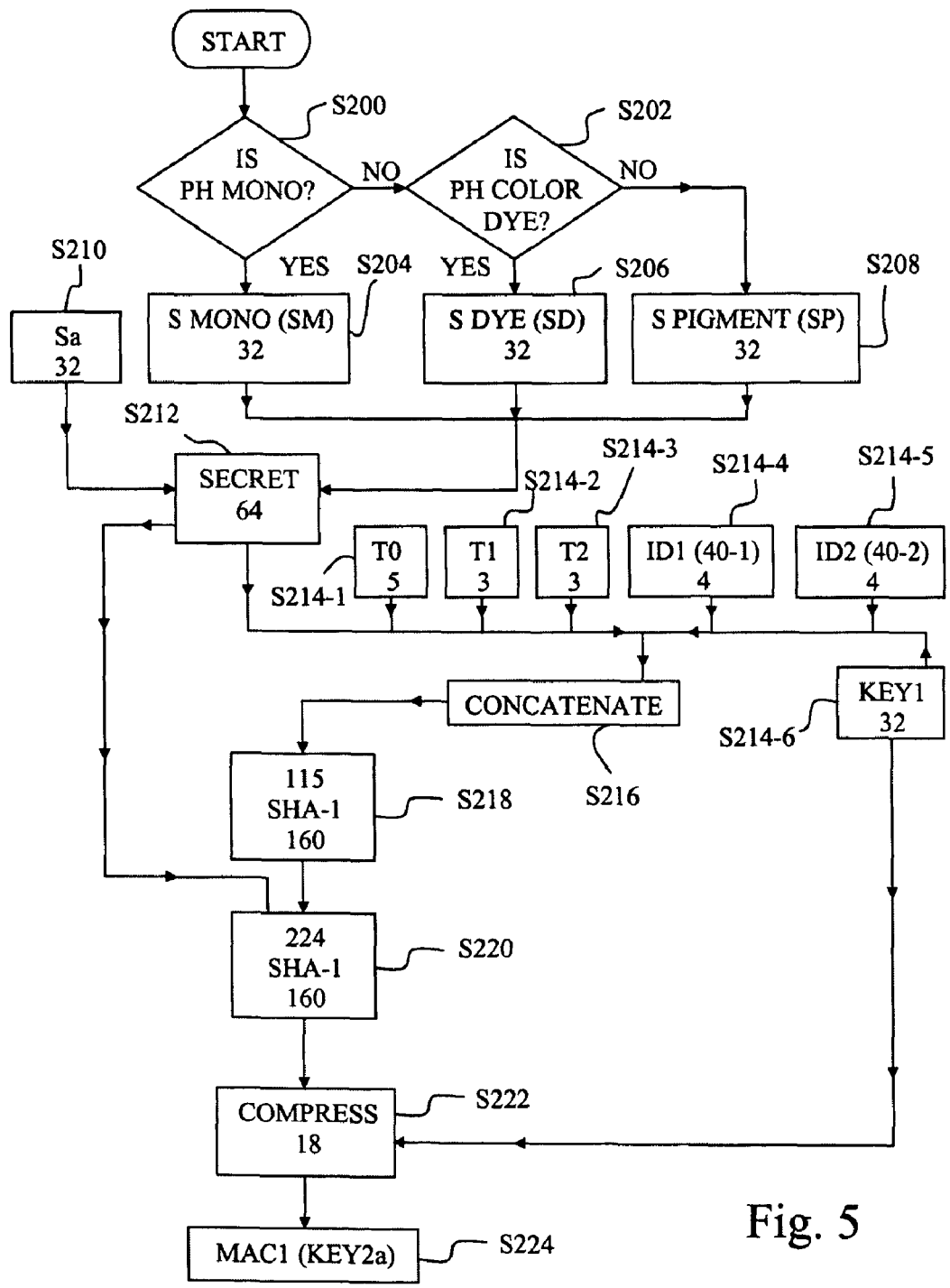
FIG. 5 is a flowchart depicting an exemplary process for generating a MAC suitable for use as the authentication code or verifying code, in accordance with the present invention.

Thus, for example, for the process of FIG. 5 through step S220, assuming a color dye printhead cartridge for the first renewal the pseudo-code will be: SHA (SaSDSHA (Key1ID1ID2T0TIT2SDSapad)pad), wherein "" represents concatenation, "pad" is used in the SHA-1 algorithm to increase the input to be a 512-bit input, and SHA is the SHA-1 algorithm.

Figure 7:
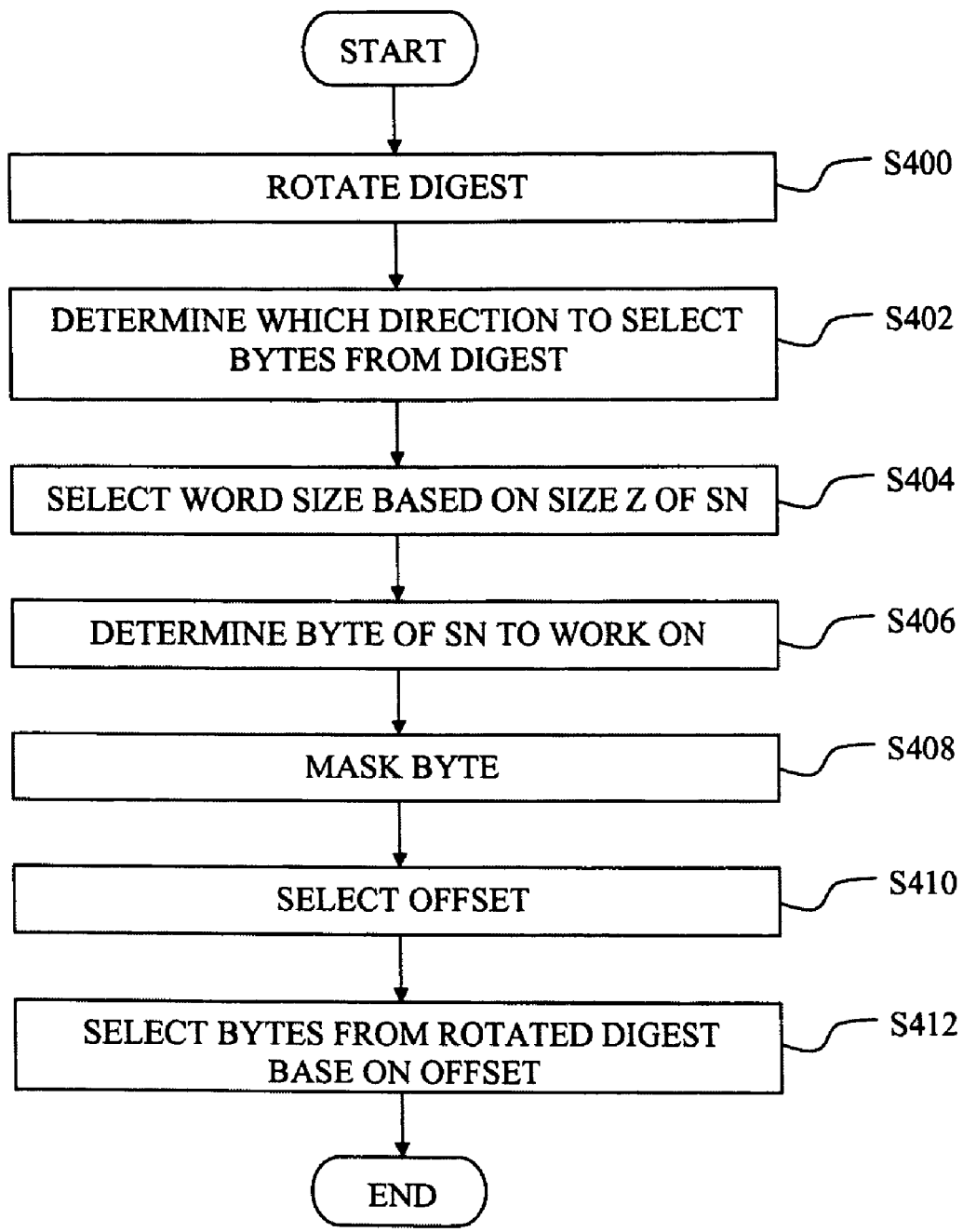
FIG. 7 is a flowchart depicting an exemplary method of compressing the digest as shown in FIGS. 5 and 6.

At step S222, a compression algorithm using the 32-bit pseudo-random ID (Key1) from location 42-1, which will be described in more detail below with respect to FIG. 7, is used to reduce the 160-bit output digest of step S220 to 18 bits to form MAC1 (i.e., Key2$a$).

At step S224, the 18-bit MAC1 is stored in memory location 44-1 (see FIG. 2) of memory 33 of ink jet printhead cartridge PH.

Figure 6:
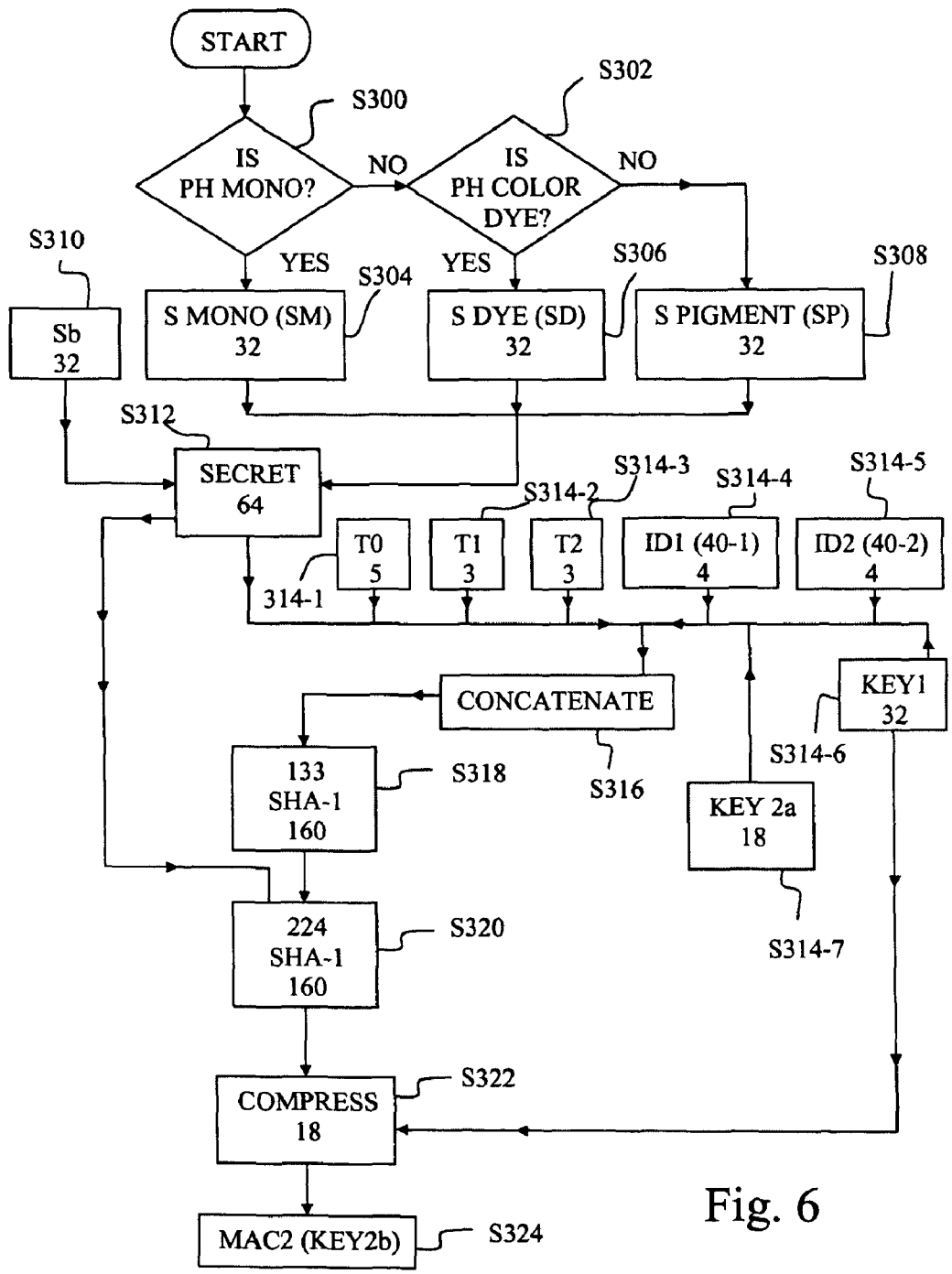
FIG. 6 is a flowchart depicting another exemplary process for generating a MAC suitable for use as the authentication code or verifying code, in accordance with the present invention.

To accommodate a second renewal of supply item 26, e.g., ink jet printhead cartridge PH, the process of FIG. 6 may be used. The generation of MAC2, also referred to herein as Key2$b$, to complete a second renewal of supply item 26 will now be described with respect to FIG. 6. While the example of FIG. 6 is described for convenience with supply item 26 being ink jet printhead cartridge PH, those skilled in the art will recognize that the process of FIG. 6 is adaptable to other types of supply items and/or consumables. Also, reference to specific numbers of bits used in association with particular variables is exemplary, and may be changed to accommodate the design constraints of a particular system. Also, it is to be understood that the same algorithm used generate the MAC for renewal of the consumable, e.g., supply item 26, printhead cartridge PH, etc., can be used by imaging device 12 in generating the verifying MAC to be compared with the MAC stored in memory 33 to verify the authenticity of the renewed consumable.

At steps S300 and S302, it is determined whether the ink jet printhead cartridge PH is a monochrome cartridge, a color dye cartridge, or a color pigment cartridge. Of course, these steps can be easily expanded to cover other ink types.

Depending upon the ink type, e.g., mono, color dye or color pigment, at steps S304, S306 or S308 a specific 32 bit secret is selected, designated as SM for mono, SD for color dye, and SP for color pigment.

Also, at step S310, a 32-bit secret (Sb) corresponding to MAC2 (Key2$b$), is selected.

At step S312, a 64 bit secret is created by concatenating secret Sb with one of secrets SM, SD or SP.

At steps S314, various parameters stored in memory 33 of ink jet printhead cartridge PH are retrieved. In this example, step S314-1 retrieves the 5-bit time parameter T0, step S314-2 retrieves the 3-bit time parameter T1, step S314-3 retrieves the 3-bit time parameter T2, step S314-4 retrieves the 4-bit ID1 from location 40-1, step S314-5 retrieves the 4-bit ID2 from in location 40-2, step S314-6 retrieves the 32-bit pseudo-random ID (Key1) from location 42-1, and step S314-7 retrieves the 18-bit Key2$a$ (MAC1) from location 44-1.

At step S316, the 64-bit secret from step S312 is concatenated with the parameters retrieved in steps S314 from memory 33 of ink jet printhead cartridge PH.

At step S318, the 133-bit output from step S316 will be processed using a SHA-1 algorithm to generate a 160-bit output digest.

At step S320, the 64-bit secret generated at step S312 is concatenated with the 160-bit output of step S318 to form a 224-bit input to step S320, which in turn is processed using a SHA-1 algorithm to generate a second 160-bit output digest.

Thus, for example, for the process of FIG. 6 through step S320, assuming a mono printhead cartridge for the second renewal the pseudo-code will be: SHA (SbSMSHA (Key1ID1ID2Key2$a$T0T1T2SMSbpad)pad), wherein "**" represents concatenation, "pad" is used in the SHA-1 algorithm to increase the input to the SHA-1 algorithm to a 512-bit input, and SHA is the SHA-1 algorithm.

At step S322, a compression algorithm using the 32-bit pseudo-random ID (Key1) from location 42-1, which will be described in more detail below with respect to FIG. 7, is used to reduce the 160-bit output digest of step S320 to 18 bits to form MAC2 (i.e., Key2b). Of course, other embodiments according to the present invention can use other bit lengths. For example, it is also contemplated that the 160-bit output digest could be reduced to, for example 16 bits or 32 bits to form MAC2.

At step S324, the 18-bit MAC2 is stored in memory location 44-2 (see FIG. 2) of memory 33 of ink jet printhead cartridge PH.

In order to generate a verifying MAC, for example, the same process described above is used, wherein the EAS 60 residing in ASIC 28 of imaging device 12 accesses a secret residing in secret storage module 58, and accesses memory 33 of supply item 26 to read the information pertaining to supply item 26, such as for example, the pseudo-random identification number of location 42-1; time values T0, T1 and T2 of locations 42-2, 42-3 and 42-4, which EAS 60 can then use to generate the MAC. Once the verifying MAC is generated, it can be compared to the respective MAC stored in memory 33 to determine the authenticity of the consumable. For example, if the verifying MAC equals the respective MAC stored in memory 33, then the consumable, e.g., supply item 26, has been verified as being authentic.

According to an aspect of the present invention, an exemplary method of compressing the digest mentioned above at step S222 of FIG. 5 and S322 of FIG. 6 will now be described in greater detail. In general, the method converts a first binary number having a first number of bits, e.g., such as a 160-bit digest output, to a second binary number having a second number of bits, e.g., an 18-bit MAC. In the example illustrated below, a masking method compresses the output (i.e., digest) of a hashed message authentication code (HMAC), e.g., from 160 bits to 18 bits, using a lossy compression algorithm. However, the masking method is not limited by the length of the input or output. As in the example, the number of bits of the first binary number is greater than the number of bits of the second binary number.

Hereinafter, unless otherwise indicated, the term "digital signature" refers to the output of the lossy compression technique used in the masking method. The "digest" is the output of the HMAC, which will undergo a lossy compression (inputs to compression algorithm cannot be determined from output), and accordingly, is the input to the lossy compression method.

This compression method is a function of the digest, as well as part of the input to the HMAC. In one example, the input to the HMAC used as the input to the lossy compression algorithm is the unique serial number (SN), which is 32-bits in this case. The serial number SN is a 32-bit number corresponding to the pseudo-random supply item ID stored at memory location 42-1 in memory 33 (FIG. 2). It is to be understood, however, that the masking method is designed to handle any length of the SN.

Referring conjunctively to FIG. 7 and the following pseudo code, an exemplary compression method for converting the 160-bit digest to the 18-bit MAC will now be described:

As used in the pseudo code below:
Serial Number=SN
Size of Serial Number in bytes=Z
HMAC output digest size in bytes=B
HMAC output digest=BS
Digital Signature size in bytes=N
Digital Signature=NS
B must be greater or equal to N First, the digest is rotated based on SN Mod 11(step S400). This makes sure all bits are eligible for selection. The pseudo code for rotating the digest is represented by:
temp_hash=" "; //20 bytes of data
rotate_count=SN mod 11
For I=0 to rotate_count Begin
　　temp_hash[I]=BS[B-rotate_count+I)
End
// Handle special case of rotate_count=0 . . . in this case BS is not shifted
if rotate_count=0 then { }
else begin
For I=rotate_count to (B–1)
　　temp_hash[I]=BS[I–rotate_count];
end
BS=temp_hash
endif It is noted that the original digest size B is 160 bits or 20 bytes. The 32 bit serial number is operated on by mod 11, returning an integer remainder "rotate_count" having a value between 0 and 10. This represents the amount of shift in bytes of the original digest. In other words, a number of bits equal to rotate_count* 8 are "rotated" from one end of the digest to the other end of the digest. It will be appreciated that the rotation can occur from right to left, or vice versa.

A function selection_direction(SN) is defined which takes the serial number in and returns a true/false which determines which the direction the bytes from the digest are selected (step S402). Assume, the left most significant bits are taken:
Function select_direction(SN){

Next, an integer "temp" is defined which is used to select the correct word size based on the length of the serial number SN. The word size must be big enough to hold the serial number SN converted to integer (step S404).
int temp;
temp=(unsigned short int)*SN // Up to 16 bits
or
if Z>2 then temp=(unsigned long int)*SN // Up to 32 bits
or
if Z>4 then temp=(unsigned long int)*SN // More than 32 bits

```
temp = SN[0];                              // first byte
temp = temp << 8;                          // shift it over 8 bits
temp = temp | (0x000000ff & SN[1]);        // Load the second 8 bits
temp = temp << 8;                          // shift it over 8 bits
temp = temp | (0x000000ff & SN[2]);        // Load the third 8 bits
temp = temp << 8;                          // shift it over 8 bits
temp = temp | (0x000000ff & SN[3]);        // Load the forth 8 bits
```

This is repeated until the integer temp includes a desired number of bits. The integer temp now holds an integer representation of the serial number SN.

Next, we determine the particular byte of the serial number that we are looking at and mod by the number of bytes in the integer temp (step S406):
Byte_to_work_on=temp mod sizeof(temp);

It is now necessary to set up a mask (step S408). As we are dealing with a byte, it is only necessary to account for 8 possibilities. A bit is selected in the range of 0-7. Thus, the method mods temp by 8 to yield that value:
temp=temp % 8;
If temp=0 then mask=0x01 // Masks for the value of temp.
If temp=1 then mask=0x02
If temp=2 then mask=0x04
If temp=3 then mask=0x08
If temp=4 then mask=0x10

If temp=5 then mask=0x20
If temp=6 then mask=0x40
If temp=7 then mask=0x80

If (SN[ byte_to_work_on] & mask) then return 1;   //bit set return 1
else return 0;                                     //bit not set return 0

It is now necessary to determine an offset for selecting bytes from the rotated digest (step S410). There are three cases to be considered and dealt with when determining the offset.

First Case: The first is trivial.
Case 1: If B equals N then B is the signature.

Second Case: The second case is the most complicated. A bit in the original serial number is used to determine the bytes are selected left to right or right to left. This is done to further complicate efforts to automatically generate a signature from a serial number.
Case 2: If ½B is greater than or equal to N then
  Offset in bytes to start is integer(B/N)
  Increment is integer(B/N)
  Then NS is described by the following pseudo code
  If selection_direction(SN) then begin// Left to right
  For I=0 to N-1 do
  If I=0
then NS=BS[offset]
  else NS=NS.BS[offset+(I*increment)]
  endfor
  end
  else Begin // Right to left
For I=0 to N-1 do
  If I=0
then NS=BS[B-offset]
  else NS=NS.BS[B- (offset+(I*increment))]
  End Third Case: The third case is not trivial, nor is it as complicated as case 2. A bit in the original serial number is used to determine if the bytes are selected even first or odd first. This is done to further complicate efforts to automatically generate a signature from a serial number.
Case 3: If ½ B is less than N
  Then NS is described by the following pseudo code
  NS_pos=0
  If selection_direction(SN) then begin
  For I=0 to B step 2
  If I=0 then Begin
NS=BS[I]
NS_pos++
  end
  Else Begin
NS=NS.BS[I]
NS_pos++
  End
  Endfor
  If NS_pos<N then Begin
    For I=1 to (N-NS_pos) do
      NS=NS.BS[I*2]
    endfor
  end
  end
  else begin
  For I=1 to B step 2
  If I=1 then Begin
NS=BS[I]
NS_pos++
  end
  Else Begin
NS=NS.BS[I]
NS_pos++
  End
  Endfor
  If NS_pos<N then Begin
    For I=0 to (N-NS_pos) do
      NS=NS.BS[I*2]
    endfor
  end
  end Based on the determined offset from Case 1, Case 2 or Case 3, bytes are selected from the rotated digest based on the offset. If a digital signature is wanted which is not a multiple of a byte (8 bits per byte), then "one" bits are masked off to get down to the required number of bits. In the case of 18 bits, N is 3 (24 bits) so 6 bits are masked off.

As is apparent from the foregoing description, the compression method of the invention can be used in the methods of FIGS. 5 and 6 to convert the 160-bit output digest of the HMAC operation at steps S220 and S320 to the 18-bit value of the MAC to be stored in memory 33, such as at one of locations 44-1 and 44-2.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of generating an authentication code for a consumable, comprising the steps of:
  a processor, processing an identification number assigned to a consumable using a first algorithm to generate a preliminary number different from said identification number; and
  compressing said preliminary number using a compression algorithm that utilize said identification number from which the preliminary number is generated to generate said authentication code, said compressing step comprising:
    rotating said preliminary number a predetermined number of bits based upon said identification number, said predetermined number of bits representing an amount of shift in bytes of said preliminary number for generating said rotated preliminary number;
    determining an offset from a selected end of said rotated preliminary number based upon said identification number; and
    selecting a number of bytes from said rotated preliminary number based on said offset, wherein said number of selected bytes is less than a total number of bytes of said rotated preliminary number and wherein said selected bytes constitute said authentication code.

2. The method of claim 1, wherein said compression algorithm has an output which does not allow inputs to be derived therefrom.

3. The method of claim 2, wherein said compression algorithm is a lossy compression algorithm.

4. The method of claim 1, wherein said preliminary number is 160 bits in size and said authentication code is one of 16 bits, 18 bits and 32 bits in size.

5. The method of claim 1, including the step of storing said authentication code in a memory associated with said consumable.

6. The method of claim 1, wherein said consumable is an ink jet printhead cartridge and said memory is attached to said ink jet printhead cartridge.

7. The method of claim 1, wherein said rotating includes a mod function.

8. The method of claim 7, wherein said mod function is a mod 11 function.

9. The method of claim 1, wherein said rotation is in a selected one of two directions based upon at least one bit in said identification number.

10. The method of claim 1, wherein said identification number comprises a serial number associated with said consumable.

11. The method of claim 1, wherein said preliminary number is a digest output of a hashing function.

12. A method of compressing a first binary number having a first number of bits to a second binary number having a second number of bits, said first number of bits being greater than said second number of bits, comprising the steps of:
   a processor, using a hashing algorithm with a plurality of inputs to generate an output corresponding to said first binary number; and
   compressing said first binary number using a selected one of said plurality of inputs, said compressing step comprising:
      rotating said first binary number a predetermined number of bits based upon said selected one of said plurality of inputs, said predetermined number of bits representing an amount of shift in bytes of said first binary number for generating said rotated first binary number;
      determining an offset from a selected end of said first binary number based upon said selected one of said plurality of inputs; and
      selecting a number of bytes from said rotated first binary number, based on said offset, wherein said number of selected bytes is less than a total number of bytes of said rotated binary number.

13. The method of claim 12, wherein said selected one of said plurality of inputs comprises an identification number corresponding to a consumable in the imaging device.

14. The method of claim 13, wherein said identification number comprises a serial number.

15. The method of claim 13, wherein said first binary number is a digest from said hashing algorithm.

16. The method of claim 12, wherein said mod function is a mod 11 function.

17. The method of claim 12, further comprising selecting a word size based upon a length of said selected one of said plurality of inputs.

* * * * *